H. B. Adams,
Steam-Boiler Water-Feeder,
No. 946, Reissued Apr. 24, 1860.
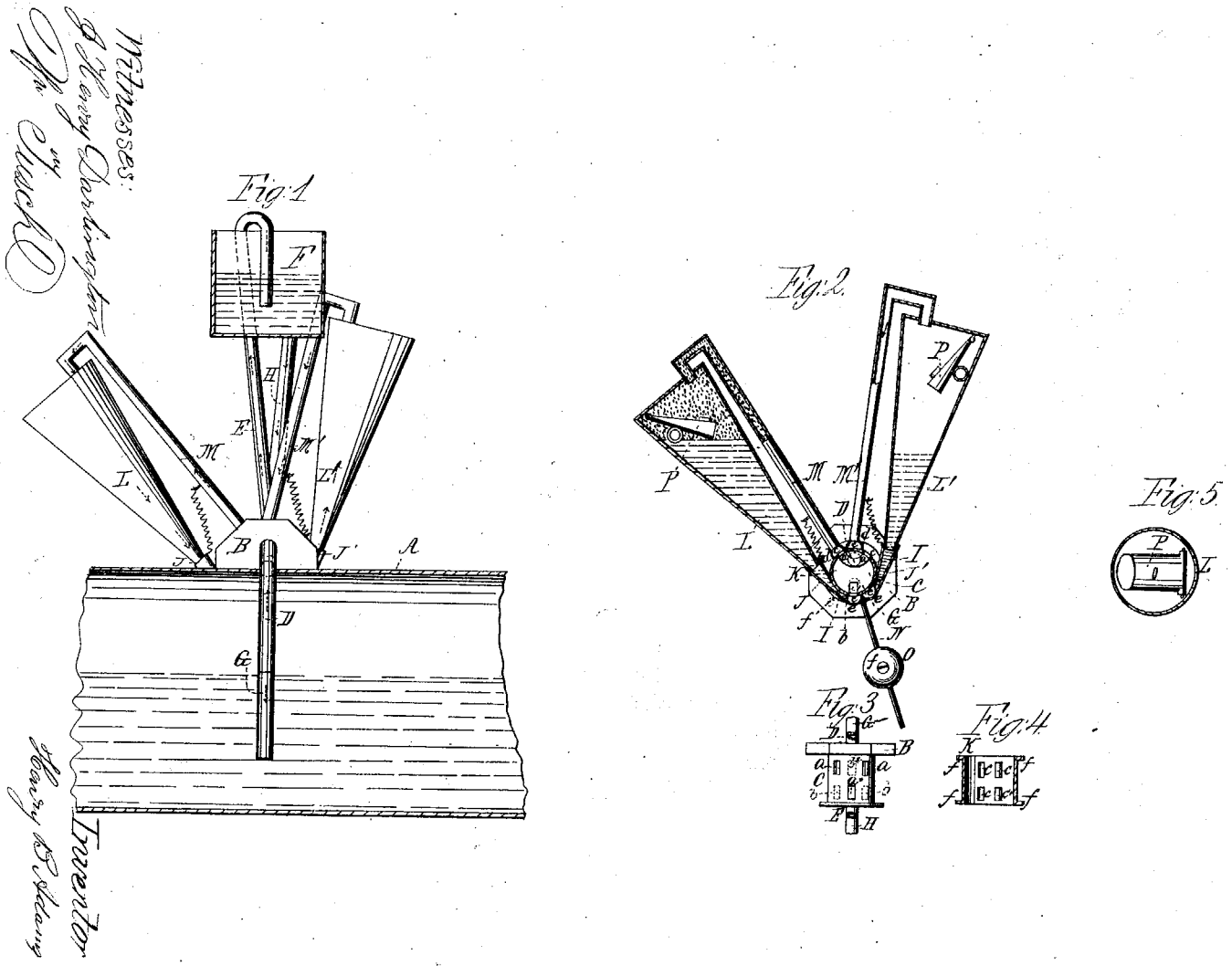
Witnesses:
J. Henry Darlington
Wm Tusch
Inventor
Henry B. Adams
AM. PHOTO-LITHO. CO. N.Y. (OSBORNE'S PROCESS.)

UNITED STATES PATENT OFFICE.

SIMON B. HUNT, OF NEW YORK, N. Y., ASSIGNEE OF HENRY B. ADAMS.

IMPROVED AUTOMATIC BOILER-FEEDER.

Specification forming part of Letters Patent No. 22,477, dated January 4, 1859; Reissue No. 946, dated April 24, 1860.

*To all whom it may concern:*

Be it known that HENRY B. ADAMS, of the city of Brooklyn, in the county of Kings and State of New York, did invent a certain new and useful Automatic Boiler-Feed; and it is hereby declared that the following is a full, clear, and exact description of the same, reference being had to the annexed drawings, and to the letters of reference marked thereon, in which—

Figure 1 represents a section of a steam-boiler with the boiler-feed attached to it. Fig. 2 is a vertical central section through the oscillating chambers and through the valve arrangement. Fig. 3 is a plan or top view of the valve. Fig. 4 is a plan view of one-half of the shell to the valve. Fig. 5 is a plan view of one of the float-valves in the oscillating chambers.

A is a portion of a steam boiler, the lower part of which is filled with water to the usual height, while the upper part contains steam. A plate, B, is securely attached to the side of the boiler, and a cylinder, C, extends from this plate, which is provided with six ports or openings, three of those ports being situated on the upper and three on the lower half of the cylinder C. The ports *a a* on the upper portion communicate with a pipe, D, which extends to the inside of the boiler and down to the high-water line, so that when the water in the boiler reaches to its highest point said pipe D is closed, but before this point has been reached it communicates with that part of the boiler only which contains steam. The port *a**, which is also situated on the upper part of the cylinder C, communicates with an exhaust-pipe, E, which extends to the water-tank F, in order to heat the water contained therein. In the same manner the port *b** on the lower portion of the cylinder C communicates with a pipe, G, which extends to the inside of the boiler and down near to its bottom, so that its opening in the boiler is always submerged in the water, and the ports *b* and *b′*, which are also situated on the lower part of the cylinder C, communicate with a pipe, H, through which water is supplied from the tank F, or from another source, as occasion may require. The cylinder C is covered by a shell, K, which is represented in the drawings in two halves, I and I′, and each of these halves is provided with four openings, *c c** and *c′ c′**, which connect by channels *d d** and *e e**, the ends of which are closed by flanges *f*, which project over the sides of the shell K. The channels *e* and *e**, which are attached to the lower half, I′, of the shell, communicate with tubes J J′, which are rigidly attached to the shell K, and which form sockets, into which the oscillating chambers L L′ fit closely, and the channels *d d** on the upper half, I, of the shell communicate with pipes M M′, which extend upward and through the covers of the oscillating chambers, so that they communicate with the upper portion of the same, and float-valves P are hinged to the covers of the chambers L L′, so that the openings of the pipes M M′ will be closed by the action of those valves, if it becomes necessary. A rod, N, extends from the middle of the lower half, I′, of the shell, and a weight, O, slides on this rod, so that it can be fastened on the same at any desired point by means of a set-screw, *f*.

The operation is as follows: The chamber L being depressed by the gravity of the water contained within it to the position shown in Figs. 1 and 2, causes the openings *c* and *c**, in the upper part, I, of the shell to be brought into such position that the opening *c* is placed right over the port *a*, so that it admits steam from the pipe D through the port *a* and the opening *c* into the pipe M, which communicates with the upper portion of the chamber L, so that the pressure in the top of that chamber (above the water contained in it) is the same as in the boiler, and the opening *c** is brought right over the post *a**, so that the upper portion of the chamber L* communicates freely with the atmosphere by means of the pipe M′, the opening *c**, the port *a**, and the exhaust-pipe E. At the same time the openings in the lower half of the shell K are so arranged that the port *b**, which communicates with the water-space in the boiler by the pipe G, is brought to communicate with the chamber L, so that the water contained therein (the pressure above the water being the same as in the boiler) flows by its gravity into the boiler, and the port *b′* is brought in communication with the chamber L′, so that the water from the tank F has free access to this chamber by means of the pipe H, which communicates with the ports

*b* and *b'*, as above described. As soon as the water enters the chamber L' it drives out the steam contained therein by the pipe E, and it may continue to flow into this chamber until its entrance is stopped by the closing of the float-valve P. The water in the chamber L being emptied into the boiler, the filling of the chamber L' with water from the tank F causes the latter to assume the position before occupied by the former, and the former to be elevated to be refilled with water from the tank F, the operation thus continuing until the water in the boiler is elevated sufficiently to close the mouth of the pipe D in the interior of the boiler. When the water in the boiler falls below the mouth of the pipe D, the chambers are operated to be filled and emptied (as before) until the water attains its proper height. The times of the oscillation of the chambers may be regulated, if desired, by changing the position of the weight O on its rod N, the time being lengthened by lowering the weight from, and shortened by raising it nearer to, its fulcrum. The chambers may be operated efficiently, however, without the weight O being applied as shown, as the change in the weight of water in the chambers is certain to operate them with perfect precision.

If desired, the tank F may be so located in relation to the chambers L L' that the surface of the water in it (the surface and supply being kept uniform by any well-known means) shall be at the height required to fill the chambers, so that the float-valves P may be dispensed with, the operation of the apparatus being otherwise as described.

It will be seen that the operation of the apparatus is perfectly automatic, and requires neither mechanical means to put it in motion, nor the attention of a person to oversee it, the motion of the chambers being given solely and entirely by the gravity of the water in the filled chamber depressing it for its contents to be emptied into the boiler, and elevating the emptied chamber to be re-filled with water from the tank, and being induced with certainty by the falling of the water in the boiler below the mouth of the pipe D, and suspended by the raising of the water in the boiler to its proper height, or so as to cover the mouth of that pipe.

What is claimed as the invention, and desired to be secured by Letters Patent, is—

1. The oscillation of the chambers L L' by the gravity of the water for the purpose of alternately filling the chambers and emptying their contents into the boiler, as set forth, when the said chambers are combined with the arrangement of means for filling and emptying them, as described.

2. The combination of the chambers L L', oscillated as described, with the cylinder C and shell K, constructed as set forth, for the purpose of producing a communication between one of the chambers and the interior of the boiler, at the same time that a communication is produced between the other chamber and the tank F, to allow one chamber to be filled with water from the tank while the contents of the other chamber are being emptied into the boiler.

3. The combination, with the chambers L L', oscillated as described, of the pipe D, to govern the movement of the chambers, as set forth.

SIMON B. HUNT,
*Assignee of H. B. Adams.*

Witnesses:
J. FARRAR,
FRANCIS S. LOW.